United States Patent [19]

Hannon

[11] 4,135,306

[45] Jan. 23, 1979

[54] CLOSURE TESTING MEANS AND METHOD

[76] Inventor: Charles N. Hannon, 27 Sargent Rd., Scarsdale, N.Y. 10583

[21] Appl. No.: 724,245

[22] Filed: Sep. 17, 1976

Related U.S. Application Data

[63] Continuation-in-part of Ser. No. 626,369, Oct. 28, 1975, abandoned.

[51] Int. Cl.² ............................. B07C 1/10; G01B 7/26
[52] U.S. Cl. ................................. 33/199 B; 33/174 L;
209/597; 209/928
[58] Field of Search ............ 33/147 M, 174 L, 178 E,
33/199 R, 199 B; 209/82, 88 R

[56] References Cited

U.S. PATENT DOCUMENTS

| 1,319,361 | 10/1919 | Rouanet | 33/174 L |
|---|---|---|---|
| 2,355,719 | 8/1944 | Fedorchak | 33/178 E |
| 2,525,136 | 10/1950 | Ingle | 33/199 R |
| 2,689,409 | 9/1954 | Fry et al. | 33/178 E |
| 2,797,496 | 7/1957 | Taft | 33/199 R |
| 3,249,223 | 5/1966 | Johnson et al. | 209/88 A |

FOREIGN PATENT DOCUMENTS

| 170844 | 3/1952 | Austria | 33/199 R |
|---|---|---|---|
| 903632 | 2/1954 | Fed. Rep. of Germany | 33/147 M |
| 1492226 | 7/1967 | France | 33/174 L |
| 2260776 | 5/1975 | France | 33/143 L |

Primary Examiner—Richard R. Stearns

[57] ABSTRACT

The depth of thread in a roll-on closure is tested by determining the radial distance between the peak and valley defining a profile of the external surface of the threaded section. Apparatus for measuring the peak includes a first sensor broad enough to span the valley. Apparatus for measuring the valley includes a sensor able to fit into the valley. The container with the closure thereon is rotated to permit the latter sensor to enter to the full depth of the thread valley in case the point at which that sensor first encounters the surface of the closure is in a shallow end of the valley or not in the valley at all. If the second sensor moves far enough relative to the first sensor and in a radial direction with respect to the closure, the apparatus will respond to such relative movement as indicating that the closure has a predetermined thread depth. If the second sensor does not move far enough relative to the first sensor within a prescribed length of time or amount of rotation of a container, after the initiation of measurement of the closure on that container, the apparatus indicates that the thread depth of that closure is less than the predetermined value.

15 Claims, 7 Drawing Figures

CLOSURE TESTING MEANS AND METHOD

CONTINUING DATA

This is a continuation-in-part of application Ser. No. 626,369 filed Oct. 28, 1975 bearing the same title and now abandoned.

FIELD OF THE INVENTION

This invention relates to the field of testing apparatus and particularly to apparatus for testing the depth of thread formed by pressure-deformation of a thin-walled cylinder to conform to the threaded neck of a container.

THE PRIOR ART

The type of closure with which this invention is concerned is frequently referred to as a roll-on closure and is usually made of thin-walled aluminum. The original shape of the closure does not include a threaded section but is generally cylindrical with a closed end. The closure is placed on the open end of the neck of a container in a capping machine and in such a relative position that the cylindrical portion, or skirt, extends down the neck a short distance. The neck of the container is much more resistent to pressure than is the cylindrical part of the closure and has an external thread. The capping machine applies relatively high axial pressure downwardly against the closed end of the closure and upwardly against the bottom of the container to hold the closure and container firmly and immovably together while one or more relatively narrow rollers engage the cylindrical portion and apply lateral pressure to it. The capping machine then produces relative rotation between the assembly of the container and closure, on one hand, and the thread-forming roller assembly on the other. These rollers exert such high radial pressure on the cylindrical part of the closure that they deform the thin metal, thus producing a threaded section.

Another pair of rollers tucks the lowermost end of the cylindrical part under a soulder on the neck of the container below the threaded end. This tucked-under part is called a pilfer-proof section, and it is scored so that it will be broken when the closure is unscrewed to open the container.

The depth of the thread formed in the cylindrical portion of the closure is determined by the depth of the thread on the container, by the amount of radial, or lateral, pressure applied by the thread rollers, and by the physical characteristics of the closure material. If the cylindrical part of the closure is pressed sufficiently deeply into the thread on the neck of the container, the closure will be held in place to form a gas-tight seal capable of withstanding pressure that might build up within the container due to the release of gas from the contents of the container. Furthermore, a properly formed thread portion on the closure will cooperate smoothly with the thread on the neck of the container in rupturing the scored pilfer-proof and allowing the closure to be removed from the container and later reapplied, if desired. On the other hand, if the thread is too shallow, the closure may be difficult to remove from the container because the axial force that can be produced on the container thread by twisting the closure with a shallow thread will not be sufficient to rupture the pilfer-proof scores. This leaves the possibility that gas in the beverage within the container will expand and provide sufficient pressure to cause the closure to blow off. This can be very dangerous to a person who is close to the container at the time of the blow off, and people have been injured by being struck in the face by such improperly threaded closures.

It is possible for any of the factors that affect the depth of thread of the roll-on closure to be outside of the normally accepted tolerances. For example, capping machines commonly have a plurality of heads, each one of which includes the aforementioned axial pressure means and means to control the movement of the thread rollers. Such means usually include cams and springs capable of applying high lateral pressure to the rollers. If the relationship between the cam and the rollers on a given capping machine head is not properly set, or if it changes a correct original setting, or if the springs become weak or break, the threads will not have the depth that they should have.

SUMMARY OF THE INVENTION

Accordingly it is one object of the present invention to provide means and a method to detect the thread depth in a roll-on closure and to indicate when the depth is likely to be insufficient.

Further objects will become apparent from the following written description together with the drawings.

According to the present invention the means for measuring thread depth include two feelers. One feeler has a surface that is straight in one dimension and, in that dimension, is approximately as long as the axial length of the threaded portion of the cylindrical part of the closure. It is at least long enough not to fit into the thread valley. The other feeler has a perimeter shaped to fit into the thread valley. Both feelers may be wheels or short cylinders mounted for rotation on parallel axles, and the second feeler is also free to move axially within a limited region sufficient to engage and follow the thread groove in the closure. The feelers are supported by means that permit relative lateral movement between them in a direction substantially radial with respect to the axis of the threaded section of the closure. When this relative movement is sufficient to correspond to insertion of the second feeler far enough into the thread valley to indicate that there is proper engagement between the threaded section of the closure and the threaded section on the neck of the container, the apparatus will indicate that the thread has been satisfactorily formed. Although an indication may be made by the apparatus as a result of having determined that the thread is deep enough, there may be no indication if the converse situation takes place, namely: failure of the second feeler to reach the position indicating sufficient depth of thread. Yet it is the condition of insufficient thread depth that is likely to be of primary interest, because containers with such improperly formed threads must actuate some form of warning device.

It is to be expected that occasionally, and even frequently, the initial contact between the second feeler and the threaded section will be in a position on the peak of the thread or at least not in the deepest part of the valley. One reason is that the second feeler is normally arranged to move axially some distance after having been captured by the thread, and it is preferable that the feeler first intercept the threaded section near one end. Therefore, the apparatus further provides means to rotate the container to make sure that the second feeler can intersect the valley and be sufficiently captured therein to follow along until it reaches the full depth of the valley. During such rotation, the first feeler continues to ride along the peak of the threaded portion.

In relation to the axis of the closure, the contact of the first feeler with the peak and of the second feeler with the valley of the thread results in a relative position between the first and second feelers that corresponds to the radial difference between the peaks and valleys of the thread groove and thus the thread depth.

A timer is provided so that if the second feeler does not intersect and move deeply enough into the thread groove to permit the two feelers to establish the correct relative position within a certain length of time after the start of measurement on a given closure, a warning will be actuated to alert operating personnel that the apparatus applying the closure to the container is not operating properly. In addition, the capping machine that applies closures to the containers and forms the thread may be halted automatically to prevent further closures from being improperly applied. Additional sensing means may be included to indicate that the thread groove exceeds a certain depth.

The measuring apparatus of this invention may be located along a side track of a conveyor system that carries capped containers away from the capping machine. In order to divert some of the capped containers from the main conveyor track to the measuring apparatus, a first conveyor switch is provided. A selected number of containers from the main conveyor is shunted to a short, second conveyor by pivoting the switch to alignment with the second conveyor and holding the switch in that position until the desired number of containers have entered the second conveyor. The measuring apparatus is located at the end of the second conveyor. After the testing has been carried out, a third conveyor carries the containers from the measuring apparatus to another conveyor switch leading back to the main conveyor. This permits groups of containers to be diverted from the main conveyor, directed through the testing station, and returned to the main conveyor instead of having to direct all of the containers through the testing station. It is likely that the capping apparatus would have to be slowed down if all of the closures were to be tested. However, if all of the closures are to be tested and if the testing apparatus cannot be operated as rapidly as the capping apparatus, it is perfectly possible to provide several testing stations and to divert each container from the capping apparatus to one or another of the testing stations.

It is desirable that the length of the second conveyor and of the third each be sufficient to accommodate as many containers as there are heads in the capping machine. In that way each batch diverted to the testing machine will contain at least one container capped by each head. By locating the first switch a predetermined distance along the conveyor system from the capping machine or by providing automatic container counting means, each closure being tested can be correlated with a specific head so that if one head starts to produce unsatisfactory threads, maintenance personnel can replace that head without having to determine by further inspection which head needs to be changed or adjusted.

DETAILED DESCRIPTION OF THE INVENTION

Figure 1:
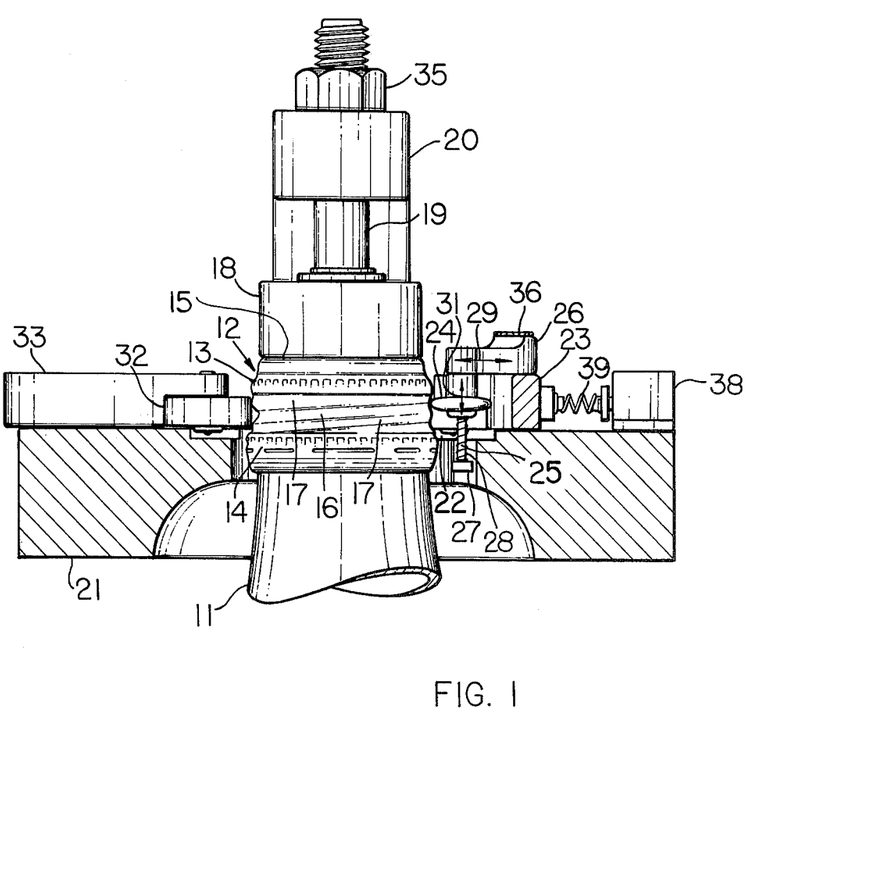
FIG. 1 shows one embodiment of feelers engaging a closure to test the thread depth in accordance with the present invention.

FIG. 1 shows the neck of a container 11 with a roll-on closure 12. The closure 12 includes an upper knurled band 13, a lower knurled band 14, and a threaded section therebetween. The threaded section includes an invented valley 16 formed between outwardly extending portions 17. The container 11 is pressed downwardly by force exerted on the upper surface 15 of the closure 12 by a thrust bearing 18 attached to the end of a threaded adjustment rod 19 mounted in an overhanging bracket 20 affixed to a base 21. The container 11 is firmly held between the thrust bearing 18 and a lower rotatable support (not shown in FIG. 1) through which rotary motion is transmitted to the container.

FIG. 1 also shows a first feeler 22 in the form of a cylinder that has a length not greater, but not substantially less, than the length of the threaded portion of the closure between the knurled bands 13 and 14. This feeler is rotatably supported on an arm 23, which is pivotally mounted on the fixed base member 21. A second feeler 24 that has a profile shaped to fit into the valley 16 in the closure 12 is rotatably supported on an axle 25 attached to a second arm 26. The axle 25 has an enlarged end 27. A spring 28 surrounds the lower end of the axle 25 and is captured by the enlarged end 27 to provide vertically upward pressure on the feeler 24. The arm 26 is pivotally mounted on the arm 23 and is capable of movement in the direction indicated by an arrow 29. The feeler 24 is also capable of movement in a perpendicular direction to that of the arm 26 as indicated by an arrow 31.

If desired, a locating member in the form of another short cylinder 32 may be rotatably mounted on a support 33 attached to the base 21. The axial length of the cylinder 32 is substantially the same as that of the cylindrical feeler 22: too long to fit into the valley 16 but short enough not to engage either of the knurled bands 13 or 14. The vertical distance in FIG. 1 between the bottom of the thrust bearing 18 and a plane through the cylinders 22 and 32, for example, the plane that coincides with the top surfaces of both of these cylinders, is carefully set by adjustment of the nut 35 so that neither of the cylinders touches either of the knurled bands. This is an important aspect of the measuring apparatus, because the most consistent and available reference surface of the closure 12 is its top surface. Even if it is not absolutely flat, the top surface of the closure is flat enough to serve as a reference plane from which to measure the distance to the threaded section of the closure and thus keep the knurled bands 13 and 14 from touching the cylinders 22 and 32.

The cylinder 32 provides a back-up for pressure of the feeler cylinder 22 and the feeler 24 against the other side of the closure 12. However, if there is sufficient pressure between the thrust bearing 18 and the rotatable means for supporting the container 11 so that, by comparison, the side pressure exerted by the feelers 22 and 24 is small, this side pressure may not need to be balanced out, and the cylinder 32 and its support 33 may be omitted.

When the arm 26 is moved in the direction of the arrow 29 to bring the feeler 24 into contact with the threaded section of a closure 12, the fact that the spring 28 biases the feeler 24 to the top of its range of vertical travel makes it likely that the feeler will not immediately slide into the valley 16 but may be well up on part of the outwardly extending section 17. However, the container 11 is then rotated in accordance with this invention, and at some point in its rotation, the upper end of the valley 16 will intersect the location of the feeler 24, and thereafter further rotation of the container will cause the feeler 24 to track along the valley into the deepest part thereof.

Figure 2:
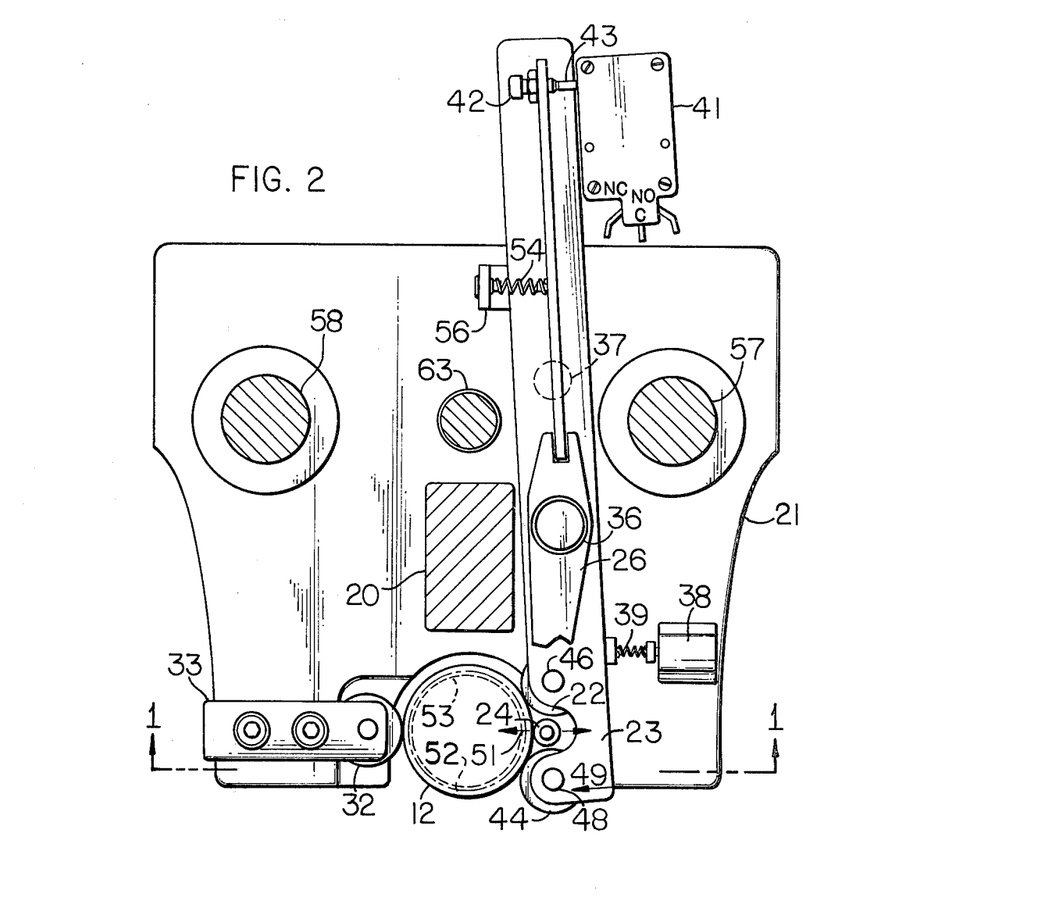
FIG. 2 is a plan view showing the feelers and immediately associated components of the embodiment in FIG. 1.

FIG. 2 shows the arrangement of the arms 23 and 26 on the base 21. The arm 23 is pivotally mounted on a pin 36 that extends into the base 21, and the arm 26 is pivotally mounted on the same pin to move with the arm 23, although it may be mounted on another pin at another location 37 on the arm 23. Any suitable means, such as a fluid-operated cylinder 38, may be used to control pivotal movement of the arm 23 about the pin 24. A spring 39 connected to the arms 23 and 26 causes the arm 26 to pivot along with the arm 23. The relative positions of the arms 23 and 26, when the testing of the depth of a thread valley is taking place, is determined by a transducer, such as a microswitch 41, which may be attached to either of the arms 23 or 26 and operated by pressure of the other arm. In this embodiment, the switch 38 happens to be mounted on the arm 23 and is actuated by pressure of the arm 26 applied by way of an adjustable screw 42 that engages an actuator pin 43 of the switch.

Instead of a single feeler cylinder 22 mounted on the arm 23 to bear against the threaded section of the closure 12 when a closure is located in position to be measured, the arm 23 preferably has two identical cylindrical feelers 22 and 44, each pivotally mounted on its respective axle 46 and 48 affixed to the arm 23. The section of the arm 23 between the feelers 22 and 44 is recessed to provide room for the feeler 24. Sufficient space is provided by the recess to allow the necessary pivotal movement of the arm 26 relative to the arm 23 without causing the feeler 24 to press against any part of the arm 23 or any part of the feeler cylinders 22 and 44.

It is quite advantageous to provide the two feelers 22 and 44 on the arm 23 so that both of these feeler cylinders can be brought into contact with the closure 12 in order to determine a basic position. The depth of the valley 16 (FIG. 1) is measured by the relative angular position between the arms 23 and 26 when the arm 26 is pivoted counterclockwise as much as possible with respect to the arm 23 when the feelers 22, 44, and 24 are all in operative position with respect to the threaded section of the closure 12. For this purpose, it may be desirable, instead of having the arm 23 pivotally mounted, to have it slidable along a path indicated by an arrow 49 that will automatically cause the feelers 22 and 44 to straddle a section of the closure 12 and allow both of the feelers 22 and 44 to bear against the threaded section of the closure.

The feeler 24, mounted so that it is between, and preferably midway between, the feelers 22 and 44, is thus constrained to move precisely radially with respect to the closure 12, which is the best direction for accurate measurement of thread depth. The effect of having the feelers 22 and 44 straddle a section of the container 12 is that it causes the section of the arm midway between these feelers to move virtually radially with respect to the closure. Thus, both the peak-measuring feelers 22 and 44 and the valley-measuring feeler 24 move in the correct direction for accurate measurement of the thread depth. This direction is indicated by an arrow 51. The feeler 24 is shown in FIG. 2 in the position it would occupy if it were resting on a peak part of the threaded section of the closure 12. The arm 26 is resiliently biased by a spring 54 compressed between the arm 26 and a stop member 56 attached to the arm 23. The spring 54 always urges the arm 26 clockwise with respect to the arm 23 and thus presses the feeler as deeply into the thread as possible. A broken-line circle 52 shows the location of the bottom of a too-shallow thread valley and a dotted circle 53 shows the location of a thread valley of the proper depth. These circles are indicative of the small difference that must be measured in accordance with this invention.

It will also be noted in FIG. 2 that the cylinder 32 is substantially directly opposite the feeler 24 and is therefore opposite the midpoint between the feelers 22 and 44. The feelers 22 and 44 and the cylinder 32 form a three-point locating system for determining the position of the axis of the closure 12, and, in fact, the feelers 22 and 44 may be mounted to be stationary on the base 21 and the cylinder 32 may be movably mounted to press the closure 12 against them. It would still be necessary to have the feeler 24 movable, preferably radially, with respect to the closure. To assist in this, the thrust bearing 18 (FIG. 1) may have a small amount of lateral play.

The closures to be tested may not be perfectly round. The spring 39 permits the arm 23 to pivot slightly on its axis as one or both feelers 22 and 44 follow the surface of the peaks of the threaded section of the closure. The arm 26 moves with the arm 23, and so the movement measured by the microswitch 41 is only a differential movement of the arm 26 relative to the arm 23. This would not be the case if the cylinder 32 were used to determine the location of the peak portions of the threaded section of the closure 12. In that case, any ellipticity of the closure 12 would produce significant movement of the feeler 24 relative to the cylinder 32. By having both the peaks and valleys measured on the same side of the closure, the effect of a small out-of-roundness of the closure produces little or no differential effect on the measurement of thread depth.

Figure 3:
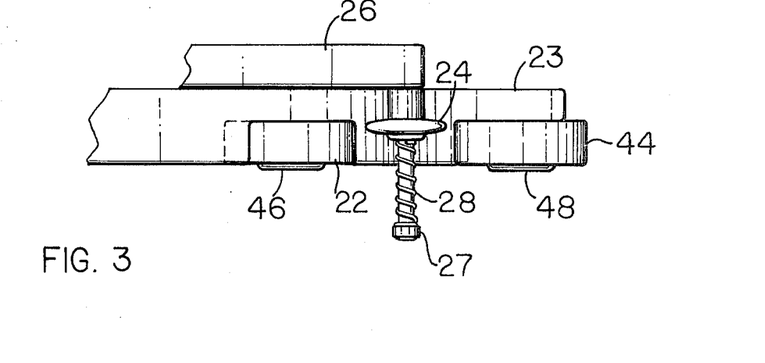
FIG. 3 is a front elevational view of the feelers in FIGS. 1 and 2.

FIG. 3 shows a slightly enlarged frontal view of the feelers 22, 24, and 44. The coplanar relationship of the short feeler cylinders 22 and 44 is quite clear in this view, as is the fact the spring 28 biases the feeler 24 to its uppermost position substantially in the same plane as the tops of the cylinders 22 and 44. Closures of the type customarily to be measured according to this invention have only about one full turn in their thread, and biasing the feeler to one end of the threaded section allows a maximum time for the feeler 24 to fall into the thread valley and follow it as the container is rotated.

Figure 4:
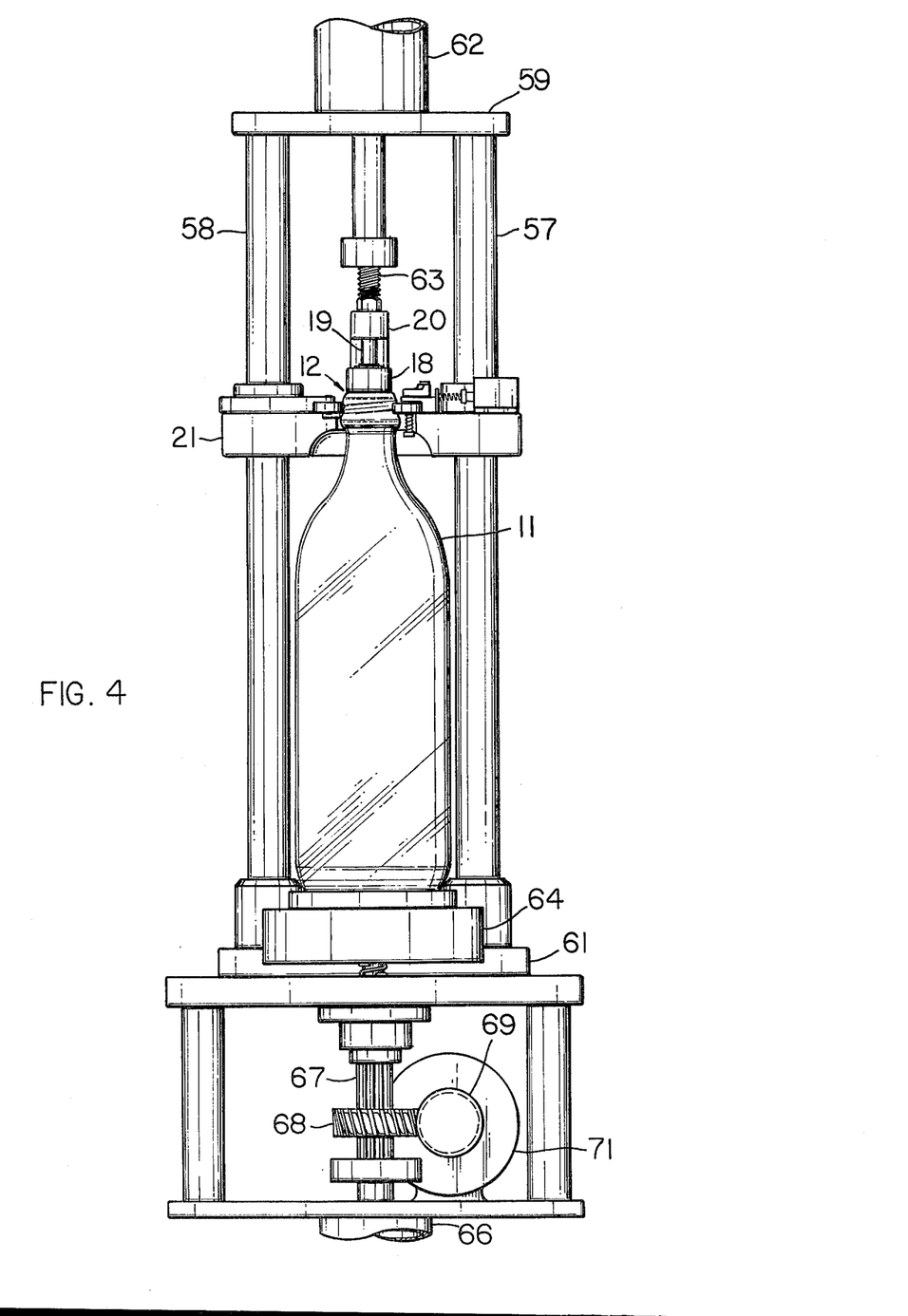
FIG. 4 is a front elevational view of the arrangement of apparatus of FIGS. 1 and 2 in a testing station according to this invention.

FIG. 4 shows a more complete front elevational view of a measuring station according to this invention. The plate 21 and measuring components on it are slidably mounted on two posts 57 and 58, which are affixed to a top plate 59 and a bottom plate 61. A fluid-operated cylinder 62 controls the position of the plate 21 along the rods 57 and 58 according to the height of the containers 11 to be measured. Alternatively, the position of the plate 21 can be adjusted by a threaded rod 63 behind the bracket 20.

The bottom of container 11 rests on a small turntable 64, the vertical position of which is controlled by a second fluid-operated cylinder 66. The shaft 67 of the piston in cylinder 66 is attached to the turntable 64 and is splined. A worm wheel 68 is slidably mounted on the shaft 67 and meshes with a worm gear 69 operated by a motor 71. Operation of this motor causes the wheel 68 to rotate and thus to rotate the shaft 67 and the turntable 64. This rotates the container 11 and its closure 12 to measure thread depth, as described previously. The pressure supplied by the cylinder 66 or by the cylinder 62 need only be sufficient to hold the upper surface of the closure 12 against the thrust bearing 18. This makes it possible either for the plate 21 to be lowered around the neck of the container 11 after the container has been put on the turntable 64 or to raise the turntable to bring the upper part of the container 11 and the closure 12 into proper position with respect to the plate 21 and the measuring apparatus thereon.

Figure 5:
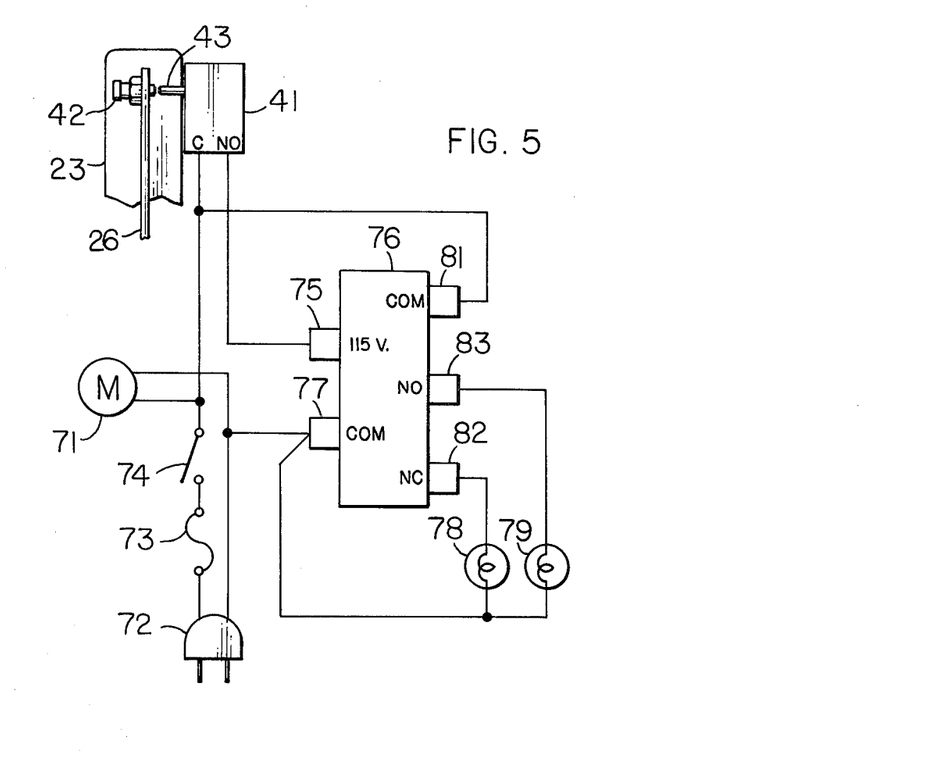
FIG. 5 is a schematic diagram of an electrical circuit associated with the apparatus of FIGS. 1-3.

FIG. 5 shows a simple circuit for use in conjunction with the apparatus of FIGS. 1-4. The circuit includes a plug 72 to plug into a standard 115 volt receptacle, a fuse 73 and a main power switch 74. The motor 71 is connected to these elements to rotate the turntable 64 (FIG. 4). The switch 74 is also connected to one terminal of the normally-closed switch 41. The other terminal of the switch 41 is connected to one input terminal 75 of a timer 76. The other input terminal 77 of the timer is connected to the common junction of the motor 71 and to the plug 72. It is also connected to a common terminal of two indicator lights 78 and 79. The common junction of the switch 41 and the switch 74 is connected to a common terminal 81 of the timer 76. This terminal is connected within the timer 76 to an arm that is normally connected to a terminal 82. When the timer has been actuated, the arm connected to the terminal 81 is moved away from the terminal 82 and into position to make contact with the normally-open terminal 83. The light 78 is connected to the terminal 82 and the light 79 to the terminal 83.

When a container 11 is in position to be tested in the apparatus in FIG. 4, the switch 74 is closed. If the feeler 24 is in the position shown in FIG. 2 so that it indicates insufficient thread depth, the arm 26 will be out of contact with the actuator 43, and the contact C of the switch 41 will be connected to the normally-closed contact NC. The timer 76 will thus be energized. However, it takes time for the timer to operate, and initially, the terminal 81 will be connected to the terminal 82, so that the light 78, which turns on as soon as the switch 74 is closed, will remain on.

If the thread of the closure being measured is deep enough, the arm 26 will be pivoted clockwise to engage the actuator 43, causing the connection between the common terminal C and the normally-closed contact NC of the switch 41 to be opened. This prevents the timer 76 from continuing to be energized, and the light 78 will therefore remain turned on. The container, having been found to have a closure with acceptable thread depth can be removed and another container substituted on the turntable 64 in FIG. 4. The circuit 76 can be arranged so that, if the thread is deep over too small an angle of rotation, the contacts of the switch 41 will again be closed, and the timer 76 can time out so as to indicate that the thread is not satisfactory.

If the thread is not deep enough at any point, the timer 76 will time out after the lapse of a calculated time interval that starts with closure of the switch 74 and is sufficient to allow the turntable 64 to rotate enough to be sure that the feeler 24 has intercepted the valley 16 of the closure 12 and has gone as deeply as that valley will permit. This may require two full turns of the turntable 64, which can be translated into a known interval to which the timer 76 can be set. At the end of this interval, the timer 76 will cause its terminal 81 to be disconnected from the terminal 82 and connected to the terminal 83 to light the light bulb 79. This terminal 83 can be connected to other circuits to respond to the indication of inadequate thread depth. For example, it can be connected to stop the capping machine. Logically, the bulb 79 (and any other circuits connected to be energized simultaneously) will be energized after the closure has not tested "satisfactory" within a selected time interval set by the timer 76. There is no direct measurement of inadequate thread depth.

Figure 6:
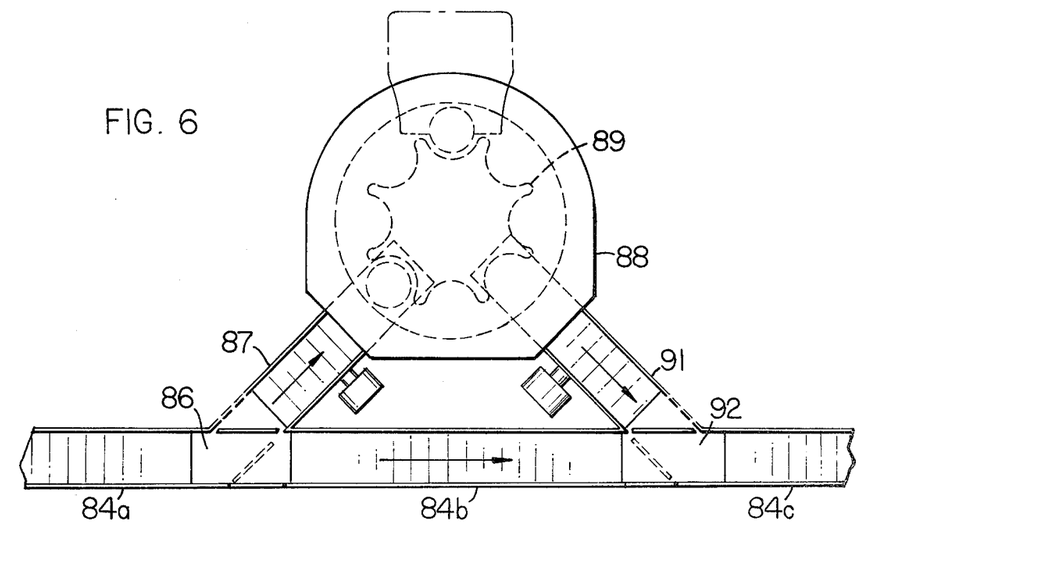
FIG. 6 is a plan view of one embodiment of testing and conveyor apparatus according to this invention.

FIG. 6 is a simplified representation of a conveyor arrangement for selecting containers, bringing them to the testing station in FIG. 4, and returning them to the main conveyor after they have been tested and not found unsatisfactory. A main conveyor 84 has an input section 84a connected to a capping machine (not shown). The section 84a terminates at a conveyor switch 86 that can be connected to a continuing section 84b of the main conveyor or to a side conveyor 87 that leads to a testing station 88 in which the apparatus in FIG. 4 is located. A star wheel 89 within the station 88 picks up each container 11 at the end of the conveyor 87 and moves the container to the turntable 64 in FIG. 4 within the station 88. The switch 74 in FIG. 5 is actuated each time a container 11 reaches the proper position to be tested.

After each of the containers diverted to the conveyor 87 has passed through the testing station 88, it emerges into a third conveyor 91 that leads to a second conveyor switch 92. This switch receives containers either from the conveyor 91 or from the intermediate conveyor 84b and passes such containers along to an output 84c of the main conveyor. The switches 86 and 92 may be timed to operate together so that a group of containers can be diverted to the conveyor 87 at the same time that a group of tested containers is moved by the conveyor 91 through the switch 92 to the output section 84c of the main conveyor.

Figure 7:
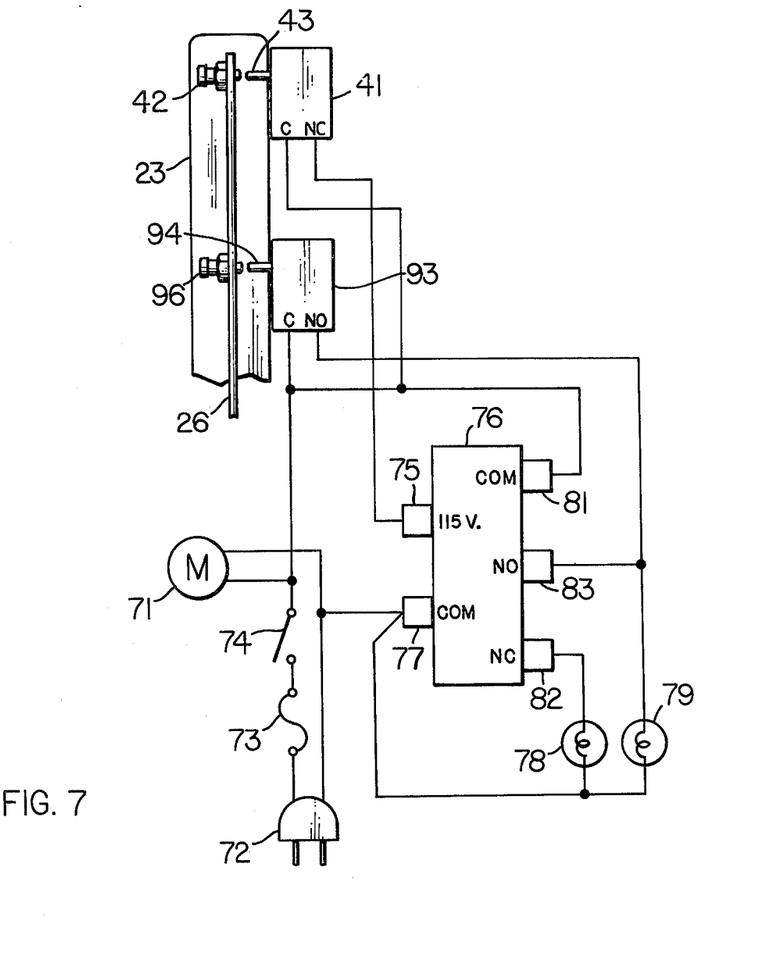
FIG. 7 is a schematic diagram of an electrical circuit associated with a modification of the apparatus in FIGS. 1-3.

FIG. 7 shows a modification of the circuit in FIG. 5 to indicate too great a thread depth or the absence of a closure 12. Most of the components in FIG. 7 are identical with those in FIG. 5 and have corresponding reference numbers. The new components are a microswitch 93 with its actuator 94 and an adjustable screw 96.

The switch 93, like the switch 41, is mounted on the arm 23. The screw 96 is set so that it presses on the actuator 94 sufficiently to actuate the switch only if the arm 26 pivots so far clockwise as to indicate that the thread depth is excessive. This can happen if the pressure on the thread-forming rollers in the capping machine is too great. The metal wall of the closure can actually be cut through by the thread-forming rollers, and that is undesirable because it creates a sharp edge on the closure just at the point where a user is likely to grasp it.

Electrically, actuation of the switch 93 by pressure on its actuator connects one terminal C to a normally-open terminal NO, and directly connects the power line at the switch 74 to the common connection of the terminal 83 and the bulb 79 and any other circuits connected in parallel with that bulb. The switch 93 simply by-passes the timer 76 and gives a warning immediately that the closure 12 being measured is unsatisfactory.

What is claimed is:

1. Apparatus for testing closures on containers, said closures comprising a thin-walled cylindrical portion deformed over a predetermined axial region by external pressure to form a threaded section comprising an outer surface with outwardly extending parts and a valley therebetween in conformity with a threaded part of the neck of the container, said apparatus comprising:
    a first feeler means comprising a surface portion to engage said outwardly extending parts of said outer surface of said threaded section, said surface portion being too wide to fit into said valley;
    a second feeler means shaped to fit into said valley of said outer surface;
    means to bring said closure into contact with said first and second feeler means;
    means to rotate said container and closure;
    supporting means to support one of said feeler means for relative movement with respect to the other of said feeler means in a direction substantially perpendicular to the axis of said threaded section of said closure; and
    transducer means responsive to a relative position between said first and second feeler means in the direction substantially perpendicular to said axis of said closure corresponding to a predetermined radial difference between said outwardly extending portion of said external thread and the deepest part of said valley of said external thread to indicate when said relative position corresponds to a certain thread depth.

2. The apparatus of claim 1 comprising timing means connected to said transducer means to determine the time interval between a starting time when at least one of said feeler means engages said closure and a time when said feeler means have been in contact with the outer surface of said threaded section for at least one revolution thereof.

3. The apparatus of claim 1 in which said first feeler means comprises:
    a cylinder having a circular cross-section, the cylindrical surface thereof comprising said surface portion, and the axial length of said cylinder comprising the width dimension of said surface portion; and
    support means comprising an axle to support said cylinder for rotation.

4. The apparatus of claim 3 in which said first feeler mean comprises:
    a second cylinder having a circular cross-section and having an axial length substantially equal to the axial length of said first-named cylinder;
    second support means comprising a second axle to support said second cylinder for rotation; and
    common support means for said axles of said cylinders, said second feeler being between said first-named and said second cylinders.

5. Apparatus according to claim 4 comprising a third cylinder and means to support said third cylinder rotatably to engage said threaded section on the other side of said closure from said first and second cylinders.

6. The apparatus of claim 4 in which said second feeler means comprises:
    a rotatable member; and
    axle means to support said rotatable member to permit rotation thereof, the axis of said axle means being substantially parallel to the axis of said threaded section of a closure being tested.

7. The apparatus of claim 6 in which said axle means is elongated to permit axial movement of said rotatable member, whereby said rotatable member can follow said external thread.

8. Apparatus according to claim 1 comprising an arm to support said second feeler means, said arm being pivotally mounted move with respect to said first feeler means.

9. The apparatus of claim 8 in which said transducer means comprises a switch actuated by pivotal movement of said arm with respect to said first feeler means.

10. Apparatus according to claim 8 comprising a second arm supporting said first feeler means and pivotal support means for said second arm to permit said first feeler means to be moved toward and away from a closure being tested, said first-named arm being pivotally mounted on said second arm.

11. Apparatus according to claim 9 comprising timing means actuated to begin timing when a container is placed in position to have its closure measured, said timer having a predetermined operating time, said switch being connected to render said timer effectively inoperative if said switch is actuated within less than said predetermined time after the timing begins.

12. Apparatus according to claim 9 comprising a second switch actuated by movement of said arm farther than the movement required to actuate said first-named switch.

13. Apparatus according to claim 1 in which said containers with closures thereon move along main conveying means, said apparatus comprising:
    second conveying means for said containers;
    first conveyor switch means operable to divert a predetermined number of said containers from said main conveying means to said second conveying means, said second conveying means conveying said containers substantially into position for the closures thereon to be engaged by said first and second feeler means;
    third conveying means conveying said containers away from said first and second feeler means; and
    second conveyor switch means connected to said main conveying means and movable to receive either containers traveling along said main conveying means or containers from said third conveying means.

14. The method of testing the thread depth of the external surface of closures on containers, said method comprising the steps of:
    sensing the radial location of a peak region of the thread relative to the axis of said thread;
    sensing the radial location of a valley of the thread relative to the axis of said thread and near said peak region; and
    generating a signal when the radial location of said valley differs from the radial location of said peak region by a predetermined amount.

15. The method of claim 14 comprising the step of rotating the closure while sensing the locations of the peak region and of the valley.